United States Patent
Schreter

(10) Patent No.: US 10,558,495 B2
(45) Date of Patent: Feb. 11, 2020

(54) VARIABLE SIZED DATABASE DICTIONARY BLOCK ENCODING

(71) Applicant: Ivan Schreter, Malsch (DE)

(72) Inventor: Ivan Schreter, Malsch (DE)

(73) Assignee: SAP SE, Walldorf (DE)

( * ) Notice: Subject to any disclaimer, the term of this patent is extended or adjusted under 35 U.S.C. 154(b) by 1451 days.

(21) Appl. No.: 14/553,606

(22) Filed: Nov. 25, 2014

(65) Prior Publication Data
US 2016/0147820 A1    May 26, 2016

(51) Int. Cl.
G06F 9/50     (2006.01)
G06F 16/22    (2019.01)

(52) U.S. Cl.
CPC ........ G06F 9/5016 (2013.01); G06F 16/2282 (2019.01)

(58) Field of Classification Search
USPC ......................................................... 707/693
See application file for complete search history.

(56) References Cited

U.S. PATENT DOCUMENTS

| | | | |
|---|---|---|---|
| 5,222,235 A | 6/1993 | Hintz et al. | |
| 5,280,612 A | 1/1994 | Lorie et al. | |
| 5,594,898 A | 1/1997 | Dalal et al. | |
| 5,701,480 A | 12/1997 | Raz | |
| 5,717,919 A | 2/1998 | Kodavalla et al. | |
| 5,758,145 A | 5/1998 | Bhargava et al. | |
| 5,794,229 A | 8/1998 | French et al. | |
| 5,870,758 A | 2/1999 | Bamford et al. | |
| 5,933,833 A | 8/1999 | Musashi | |
| 6,070,165 A | 5/2000 | Whitmore | |
| 6,275,830 B1 | 8/2001 | Muthukkaruppan et al. | |
| 6,282,605 B1 | 8/2001 | Moore | |
| 6,397,227 B1 | 5/2002 | Klein et al. | |
| 6,453,313 B1 | 9/2002 | Klein et al. | |
| 6,490,670 B1 | 12/2002 | Collins et al. | |
| 6,567,407 B1 * | 5/2003 | Mizukoshi | H04L 12/5601 370/395.1 |
| 6,606,617 B1 | 8/2003 | Bonner et al. | |

(Continued)

FOREIGN PATENT DOCUMENTS

| | | |
|---|---|---|
| EP | 2778961 A1 | 9/2014 |
| WO | WO-01/29690 A2 | 4/2001 |

OTHER PUBLICATIONS

"NBit Dictionary Compression," Sybase, May 23, 2013. Web. Mar. 15, 2017 <http://infocenter.sybase.com/help/index.jsp?topic=/com.sybase.infocenter.dc1777.1600/doc/html/wil1345808527844.html>.

(Continued)

Primary Examiner — Muluemebet Gurmu
(74) Attorney, Agent, or Firm — Mintz, Levin, Cohn, Ferris, Glovsky and Popeo, P.C.

(57) ABSTRACT

Dictionary encoding in a table of a database system is initiated using a single page chain. The database system includes a plurality of processor cores and each page chain includes a plurality of chained pages. Thereafter, n additional page chains are generated for use by the dictionary encoding when the count of pages used by the dictionary encoding reaches a pre-determined limit. Generation of additional page chains is later ceased once the number of additional page chains n is equivalent to a number of available processor cores. Related apparatus, systems, techniques and articles are also described.

15 Claims, 7 Drawing Sheets

(56) References Cited

U.S. PATENT DOCUMENTS

| | | |
|---|---|---|
| 6,668,263 B1 | 12/2003 | Cranston et al. |
| 6,754,653 B2 | 6/2004 | Bonner et al. |
| 6,865,577 B1 | 3/2005 | Sereda |
| 6,965,897 B1* | 11/2005 | Chen .................. H03M 7/30 |
| 7,698,712 B2 | 4/2010 | Schreter |
| 7,761,434 B2 | 7/2010 | Surtani et al. |
| 8,024,296 B1 | 9/2011 | Gopinathan et al. |
| 8,161,024 B2 | 4/2012 | Renkes et al. |
| 8,170,981 B1 | 5/2012 | Tewksbary |
| 8,224,860 B2 | 7/2012 | Starkey |
| 8,364,648 B1 | 1/2013 | Sim-Tang |
| 8,510,344 B1 | 8/2013 | Briggs et al. |
| 8,650,583 B2 | 2/2014 | Schreter |
| 8,732,139 B2 | 5/2014 | Schreter |
| 8,768,891 B2 | 7/2014 | Schreter |
| 8,868,506 B1 | 10/2014 | Bhargava et al. |
| 9,058,268 B1 | 6/2015 | Ostiguy et al. |
| 9,098,522 B2 | 8/2015 | Lee et al. |
| 9,141,435 B2 | 9/2015 | Wein |
| 9,262,330 B2 | 2/2016 | Muthukumarasamy |
| 9,268,810 B2 | 2/2016 | Andrei et al. |
| 9,275,095 B2 | 3/2016 | Bhattacharjee et al. |
| 9,275,097 B2 | 3/2016 | DeLaFranier et al. |
| 9,305,046 B2 | 4/2016 | Bhattacharjee et al. |
| 9,372,743 B1 | 6/2016 | Sethi et al. |
| 9,430,274 B2 | 8/2016 | Zhang |
| 9,489,409 B2 | 11/2016 | Sharique et al. |
| 9,645,844 B2 | 5/2017 | Zhang |
| 9,665,609 B2 | 5/2017 | Andrei et al. |
| 9,811,577 B2 | 11/2017 | Martin et al. |
| 2001/0051944 A1 | 12/2001 | Lim et al. |
| 2002/0107837 A1 | 8/2002 | Osborne et al. |
| 2002/0156798 A1 | 10/2002 | Larue et al. |
| 2003/0028551 A1 | 2/2003 | Sutherland |
| 2003/0065652 A1 | 4/2003 | Spacey |
| 2003/0204534 A1 | 10/2003 | Hopeman et al. |
| 2003/0217075 A1 | 11/2003 | Nakano et al. |
| 2004/0034616 A1 | 2/2004 | Witkowski et al. |
| 2004/0054644 A1 | 3/2004 | Ganesh et al. |
| 2004/0064601 A1 | 4/2004 | Swanberg |
| 2004/0249838 A1 | 12/2004 | Hinshaw et al. |
| 2005/0027692 A1 | 2/2005 | Shyam et al. |
| 2005/0097266 A1 | 5/2005 | Factor et al. |
| 2005/0234868 A1 | 10/2005 | Terek et al. |
| 2006/0004833 A1 | 1/2006 | Trivedi et al. |
| 2006/0005191 A1 | 1/2006 | Boehm |
| 2006/0036655 A1 | 2/2006 | Lastovica |
| 2006/0206489 A1* | 9/2006 | Finnie .................. G06F 9/5016 |
| 2007/0192360 A1 | 8/2007 | Prahlad et al. |
| 2008/0046444 A1 | 2/2008 | Fachan et al. |
| 2008/0183958 A1 | 7/2008 | Cheriton |
| 2008/0247729 A1 | 10/2008 | Park |
| 2009/0064160 A1 | 3/2009 | Larson et al. |
| 2009/0080523 A1 | 3/2009 | McDowell |
| 2009/0094236 A1 | 4/2009 | Renkes et al. |
| 2009/0254532 A1 | 10/2009 | Yang et al. |
| 2009/0287703 A1 | 11/2009 | Furuya |
| 2009/0287737 A1 | 11/2009 | Hammerly |
| 2010/0008309 A1 | 1/2010 | Cheng et al. |
| 2010/0082545 A1 | 4/2010 | Bhattacharjee et al. |
| 2010/0241812 A1 | 9/2010 | Bekoou |
| 2010/0281005 A1 | 11/2010 | Carlin et al. |
| 2010/0287143 A1 | 11/2010 | Di Carlo et al. |
| 2011/0010330 A1 | 1/2011 | McCline et al. |
| 2011/0060726 A1 | 3/2011 | Idicula et al. |
| 2011/0087854 A1 | 4/2011 | Rushworth et al. |
| 2011/0145835 A1 | 6/2011 | Rodrigues et al. |
| 2011/0153566 A1 | 6/2011 | Larson et al. |
| 2011/0252000 A1 | 10/2011 | Diaconu et al. |
| 2011/0270809 A1* | 11/2011 | Dinkar .............. G06F 17/30156 707/692 |
| 2011/0276744 A1 | 11/2011 | Sengupta et al. |
| 2011/0302143 A1 | 12/2011 | Lomet |
| 2012/0011106 A1 | 1/2012 | Reid et al. |
| 2012/0047126 A1 | 2/2012 | Branscome et al. |
| 2012/0102006 A1 | 4/2012 | Larson et al. |
| 2012/0137081 A1 | 5/2012 | Shea |
| 2012/0179877 A1 | 7/2012 | Shriraman et al. |
| 2012/0191696 A1 | 7/2012 | Renkes et al. |
| 2012/0221528 A1 | 8/2012 | Renkes et al. |
| 2012/0233438 A1 | 9/2012 | Bak et al. |
| 2012/0265728 A1 | 10/2012 | Plattner et al. |
| 2012/0284228 A1 | 11/2012 | Ghosh et al. |
| 2013/0054936 A1 | 2/2013 | Davis |
| 2013/0060742 A1 | 3/2013 | Chang et al. |
| 2013/0091162 A1 | 4/2013 | Lewak |
| 2013/0097135 A1 | 4/2013 | Goldberg |
| 2013/0103655 A1* | 4/2013 | Fanghaenel ....... G06F 17/30336 707/693 |
| 2013/0117247 A1 | 5/2013 | Schreter et al. |
| 2013/0166566 A1 | 6/2013 | Lemke et al. |
| 2013/0346378 A1 | 12/2013 | Tsirogiannis et al. |
| 2014/0025651 A1 | 1/2014 | Schreter |
| 2014/0101093 A1 | 4/2014 | Lanphear et al. |
| 2014/0136571 A1 | 5/2014 | Bonvin et al. |
| 2014/0214334 A1 | 7/2014 | Plattner et al. |
| 2014/0222418 A1 | 8/2014 | Richtarsky et al. |
| 2014/0279930 A1 | 9/2014 | Gupta et al. |
| 2014/0279961 A1 | 9/2014 | Schreter et al. |
| 2015/0039573 A1 | 2/2015 | Bhattacharjee et al. |
| 2015/0089125 A1 | 3/2015 | Mukherjee et al. |
| 2015/0106382 A1* | 4/2015 | Liu et al. .............. G06F 16/221 707/744 |
| 2015/0113026 A1 | 4/2015 | Sharique et al. |
| 2015/0142819 A1 | 5/2015 | Florendo et al. |
| 2015/0193264 A1 | 7/2015 | Hutton et al. |
| 2015/0261805 A1 | 9/2015 | Lee et al. |
| 2015/0278281 A1 | 10/2015 | Zhang |
| 2016/0103860 A1 | 4/2016 | Bhattacharjee et al. |
| 2016/0125022 A1 | 5/2016 | Rider et al. |
| 2016/0147445 A1 | 5/2016 | Schreter et al. |
| 2016/0147447 A1 | 5/2016 | Blanco et al. |
| 2016/0147448 A1 | 5/2016 | Schreter et al. |
| 2016/0147449 A1 | 5/2016 | Andrei et al. |
| 2016/0147457 A1 | 5/2016 | Legler et al. |
| 2016/0147459 A1 | 5/2016 | Wein et al. |
| 2016/0147617 A1 | 5/2016 | Lee et al. |
| 2016/0147618 A1 | 5/2016 | Lee et al. |
| 2016/0147750 A1 | 5/2016 | Blanco et al. |
| 2016/0147776 A1 | 5/2016 | Florendo et al. |
| 2016/0147778 A1 | 5/2016 | Schreter et al. |
| 2016/0147786 A1 | 5/2016 | Andrei et al. |
| 2016/0147801 A1 | 5/2016 | Wein et al. |
| 2016/0147804 A1 | 5/2016 | Wein et al. |
| 2016/0147806 A1 | 5/2016 | Blanco et al. |
| 2016/0147808 A1 | 5/2016 | Schreter et al. |
| 2016/0147809 A1 | 5/2016 | Schreter et al. |
| 2016/0147811 A1 | 5/2016 | Eluri et al. |
| 2016/0147812 A1 | 5/2016 | Andrei et al. |
| 2016/0147813 A1 | 5/2016 | Lee et al. |
| 2016/0147814 A1 | 5/2016 | Goel et al. |
| 2016/0147819 A1 | 5/2016 | Schreter et al. |
| 2016/0147820 A1 | 5/2016 | Schreter |
| 2016/0147821 A1 | 5/2016 | Schreter et al. |
| 2016/0147834 A1 | 5/2016 | Lee et al. |
| 2016/0147858 A1 | 5/2016 | Lee et al. |
| 2016/0147859 A1 | 5/2016 | Lee et al. |
| 2016/0147861 A1 | 5/2016 | Schreter et al. |
| 2016/0147862 A1 | 5/2016 | Schreter et al. |
| 2016/0147904 A1 | 5/2016 | Wein et al. |
| 2016/0147906 A1 | 5/2016 | Schreter et al. |

OTHER PUBLICATIONS

"HANA database lectures—Outline Part 1 Motivation—Why main memory processing." Mar. 2014 (Mar. 2013). XP055197666. Web. Jun. 23, 2015. 81 pages.; URL:http://cse.yeditepe.edu.tr/-odemir/spring2014/cse415/HanaDatabase.pdf.

"HANA Persistence: Shadow Pages." Jun. 2013. *Yeditepe Üniversitesi Bilgisayar Mühendisliği Bölümü.* Web. Apr. 21, 2016. 32 pages. <http://cse.yeditepe.edu.tr/~odemir/spring2014/cse415/Persistency.pptx>.

(56) References Cited

OTHER PUBLICATIONS

"Optimistic concurrency control." *Wikipedia: The Free Encyclopedia.* Wikimedia Foundation, Inc., Jul. 19, 2014. Web. Mar. 3, 2016. pp. 1-3.
Brown, E. et al. "Fast Incremental Indexing for Full-Text Information Retrieval." *VLDB '94 Proceedings of the 20th International Conference on Very Large Data Bases.* San Francisco: Morgan Kaufmann, 1994, pp. 1-11.
Jens Krueger et al. "Main Memory Databases for Enterprise Applications." Industrial Engineering and Engineering Management (IE &EM), 2011 IEEE 18th International Conference on, IEEE, Sep. 3, 2011 (Sep. 3, 2011), pp. 547-557, XP032056073.
Lemke, Christian, et al. "Speeding Up Queries in Column Stores." *Data Warehousing and Knowledge Discovery Lecture Notes in Computer Science* (2010): 117-29. Web. Apr. 21, 2016.
Lu, Andy. "SAP HANA Concurrency Control." *SAP Community Network.* Oct. 28, 2014. Web. Apr. 22, 2016. 4 pages. <http://scn.sap.com/docs/DOC-57101>.
Mumy, Mark. "SAP Sybase IQ 16.0 Hardware Sizing Guide." *SAP Community Network.* May 12, 2013, Web. Apr. 21, 2016. 25 pages. <http://www.sdn.sap.com/irj/scn/go/portal/prtroot/docs/library/uuid/c0836b4f-429d-3010-a686-c35c73674180?QuickLink=index&overridelayout=true&58385785468058>.
Ailamaki, et al., "Weaving Relations for Cache Performance," Proceedings of the the Twenty-Seventh International Conference on Very Large Data Bases, Sep. 11-14, Orlando, FL, Jan. 1, 2001.
Hector Garcia-Molina, et al., "Database Systems The Second Complete Book Second Edition-Chapter 13—Secondary Storage Management, " *Database Systems the Complete Book, second edition*, Jun. 15, 2008.

\* cited by examiner

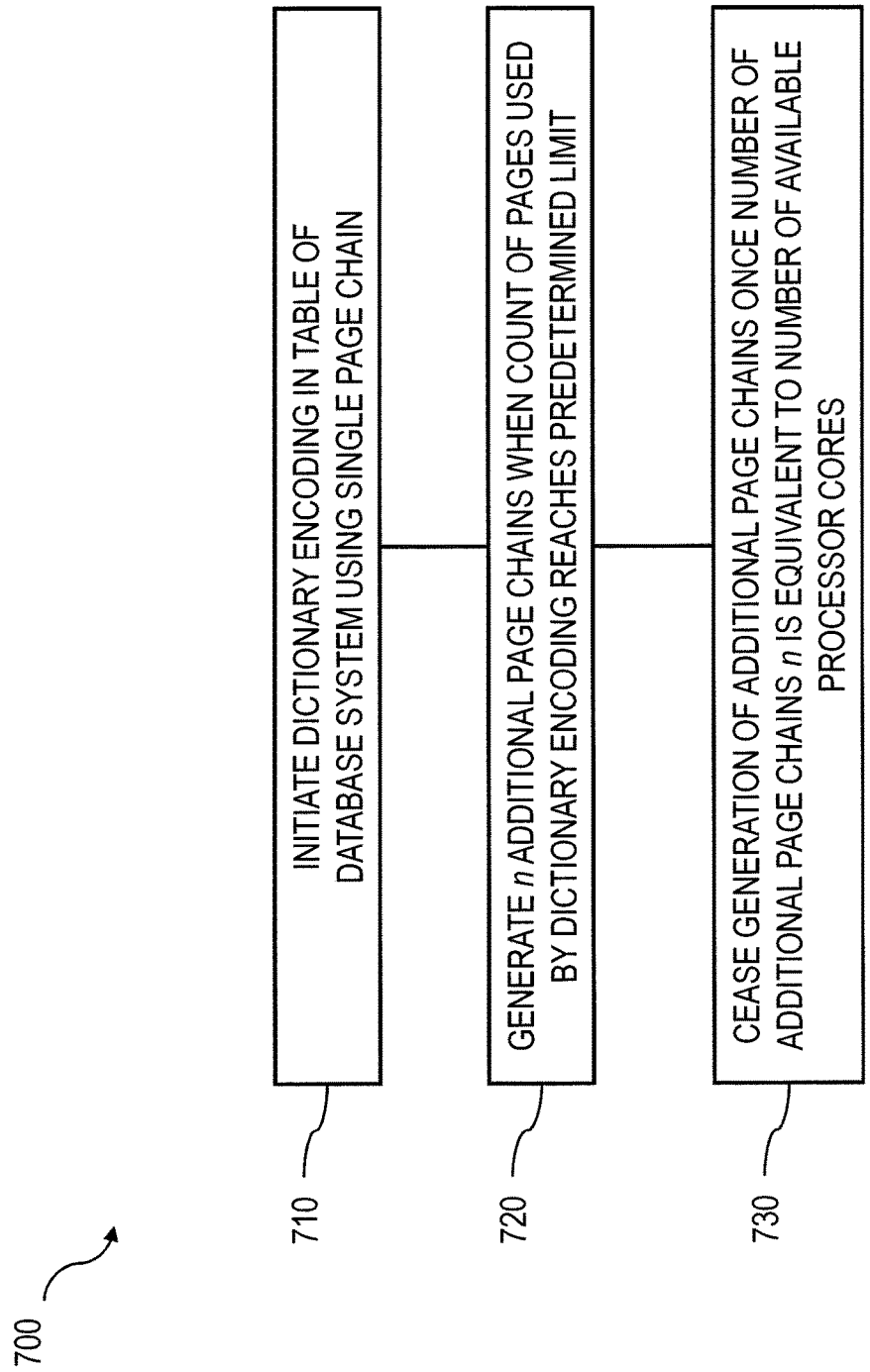

VARIABLE SIZED DATABASE DICTIONARY BLOCK ENCODING

TECHNICAL FIELD

The subject matter described herein relates to dictionary block encoding with variable sized blocks in a database.

BACKGROUND

With advanced database systems having in-memory architectures, memory access can be one of the largest bottlenecks affecting performance. Techniques such as dictionary-based compression can reduce the number of input/output channel (I/O) operations to main memory.

With columnar databases, dictionary encoding can split a column into a dictionary and an attribute vector. The dictionary stores all unique values with corresponding value identifiers. The attribute vector, on the other hand, stores all value identifiers for all entries in the column. Positions within the column are stored implicitly and offsetting is enabled with bit-encoded fixed-length data types. The entries in the dictionary can be sorted and, additionally, compressed to provide for quicker access.

With conventional insert-only database systems, dictionary-based encoding can use variable sized blocks that are allocated in an append-only structure in a page chain. With such an arrangement, all allocations attempt to append data to the last page in the page chain, which can result in cache collisions on some cache lines containing global state information (such as allocation pointers, etc.). These collisions therefore limit scalability of parallel database manipulation language (DML) commands and/or parallel dictionary encoding.

SUMMARY

In one aspect, dictionary encoding in a table of a database system is initiated using a single page chain. The database system includes a plurality of processor cores and each page chain includes a plurality of chained pages. Thereafter, n additional page chains are generated for use by the dictionary encoding when the count of pages used by the dictionary encoding reaches a pre-determined limit. Generation of additional page chains is later ceased once the number of additional page chains n is equivalent to a number of available processor cores.

The page chains can include a set of active pages on which write operations are accepted. The database can have an in-memory architecture in which active pages are held in memory. In some cases, the database is a columnar in-memory database. The database can also take the form of a non-uniform memory access (NUMA) architecture. The NUMA architecture can include a plurality of NUMA nodes such that processors forming part of the same NUMA node are assigned to the same page chain.

A new variable sized value can be stored to the dictionary by picking a page chain corresponding to a current core index. The current core index can correspond to a processor core on which an executing thread is currently running.

Non-transitory computer program products (i.e., physically embodied computer program products) are also described that store instructions, which when executed by one or more data processors of one or more computing systems, causes at least one data processor to perform operations herein. Similarly, computer systems are also described that may include one or more data processors and memory coupled to the one or more data processors. The memory may temporarily or permanently store instructions that cause at least one processor to perform one or more of the operations described herein. In addition, methods can be implemented by one or more data processors either within a single computing system or distributed among two or more computing systems. Such computing systems can be connected and can exchange data and/or commands or other instructions or the like via one or more connections, including but not limited to a connection over a network (e.g. the Internet, a wireless wide area network, a local area network, a wide area network, a wired network, or the like), via a direct connection between one or more of the multiple computing systems, etc.

The subject matter described herein provides many technical advantages. For example, the current subject matter provides significantly better scalability of dictionary encoding (avoiding collisions) without sacrificing significant amounts of memory. Such an arrangement, allows for enhanced performance for a variety of database system such as non-uniform memory access (NUMA) systems with multiple sockets.

The details of one or more variations of the subject matter described herein are set forth in the accompanying drawings and the description below. Other features and advantages of the subject matter described herein will be apparent from the description and drawings, and from the claims.

DESCRIPTION OF DRAWINGS

FIG. 7 is a process flow diagram illustrating variable sized dictionary block encoding.

Like reference symbols in the various drawings indicate like elements.

DETAILED DESCRIPTION

The current subject matter includes a number of aspects that can be applied individually or in combinations of one or more such aspects to support a unified database table approach the integrates performance advantages in-memory database approaches with reduced storage costs of on-disk database approaches. The current subject matter can be implemented in database systems using in-memory OLAP, for example including databases sized at several terabytes (or more), tables with billions (or more) of rows, and the like; systems using in-memory OLTP (e.g. enterprise resource planning or ERP system or the like, for example in databases sized at several terabytes (or more) with high transactional volumes; systems using on-disk OLAP (e.g. "big data," analytics servers for advanced analytics, data warehousing, business intelligence environments, or the like), for example databases sized at several petabytes or even more, tables with up to trillions of rows, and the like.

Figure 1:
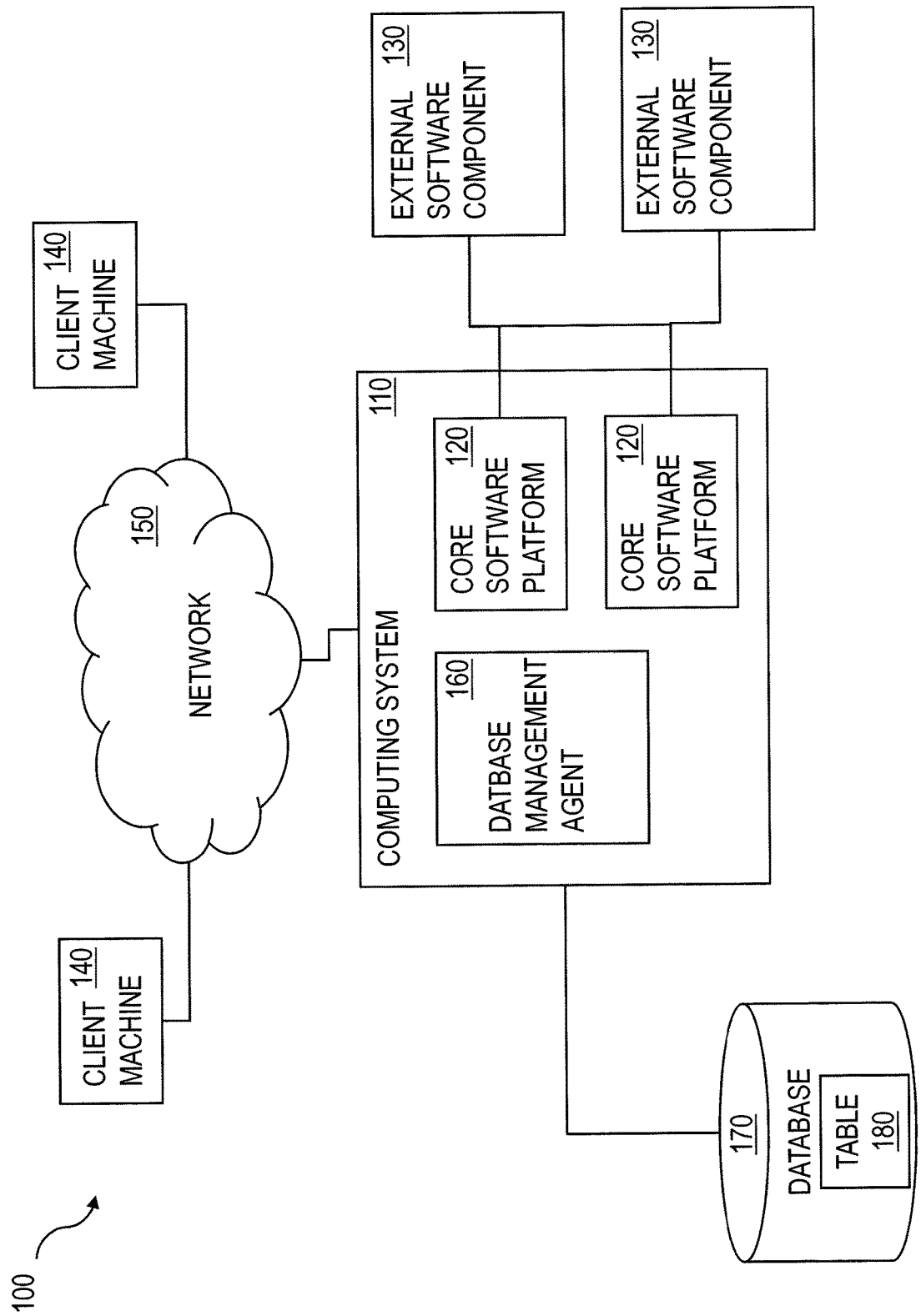
FIG. 1 is a diagram illustrating features of a business software system architecture.

The current subject matter can be implemented as core software platform of an enterprise resource planning (ERP) system, other business software architecture, or other data-intensive computing application or software architecture that runs on one or more processors that are under the control of a specific organization. This arrangement can be very effective for a large-scale organization that has very sophisticated in-house information technology (IT) staff and for whom a sizable capital investment in computing hardware and consulting services required to customize a commercially available business software solution to work with organization-specific business processes and functions is feasible. FIG. 1 shows a diagram 100 of a system consistent with such an implementation. A computing system 110 can include one or more core software platform modules 120 providing one or more features of the business software system. The computing system can also aggregate or otherwise provide a gateway via which users can access functionality provided by one or more external software components 130. Client machines 140 can access the computing system, either via a direct connection, a local terminal, or over a network 150 (e.g. a local area network, a wide area network, a wireless network, the Internet, or the like).

A data management agent 160 or other comparable functionality can access a database management system 170 that stores and provides access to data (e.g. definitions of business scenarios, business processes, and one or more business configurations as well as data, metadata, master data, etc. relating to definitions of the business scenarios, business processes, and one or more business configurations, and/or concrete instances of data objects and/or business objects that are relevant to a specific instance of a business scenario or a business process, and the like. The database management system 170 can include at least one table 180 and additionally include parallelization features consistent with those described herein.

Figure 2:
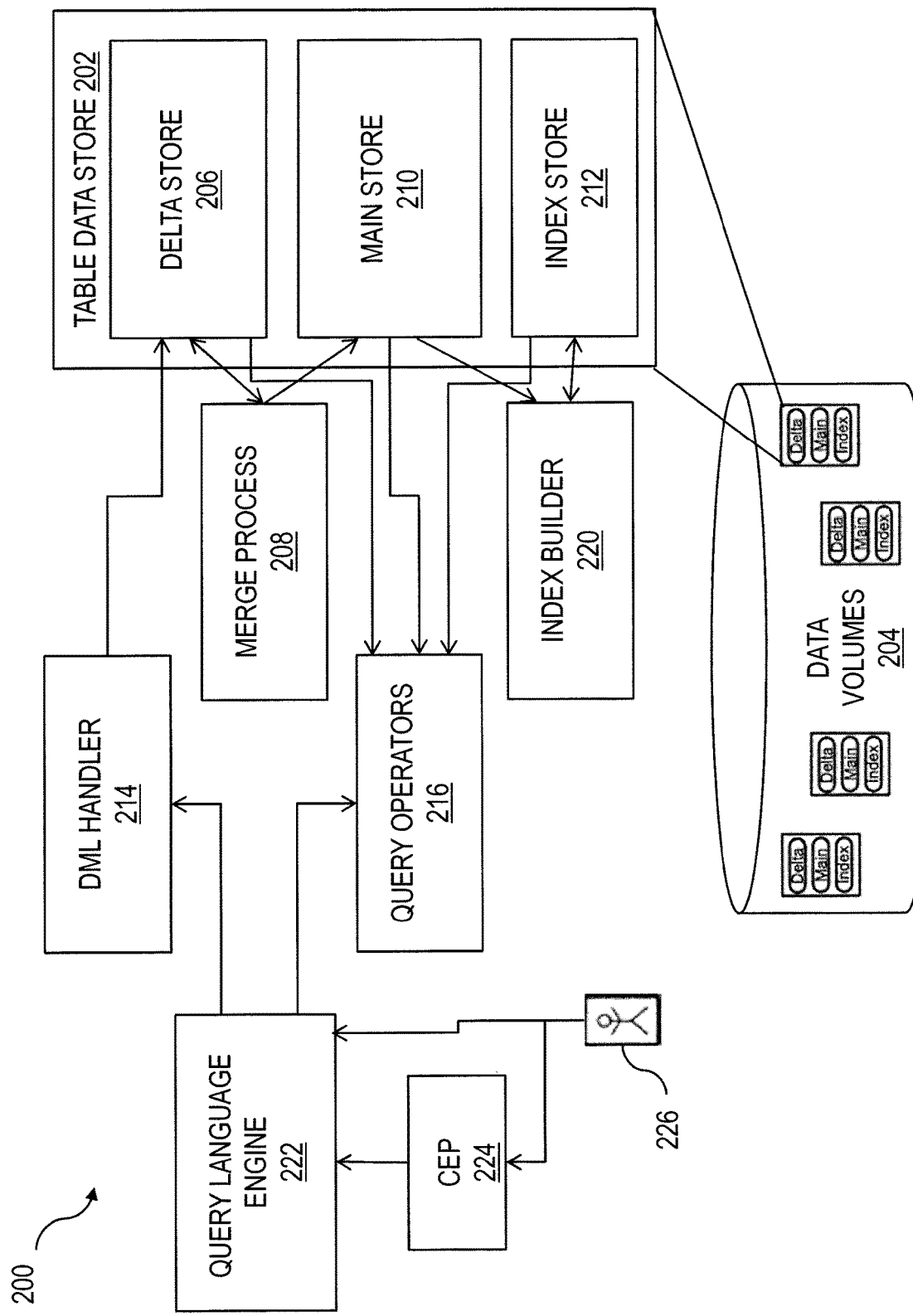
FIG. 2 is a block diagram illustrating features of a business software architecture.

FIG. 2 shows a block diagram 200 of an architecture illustrating features that can be included in a database or database management system (such as that illustrated in diagram 100 of FIG. 1) consistent with implementations of the current subject matter. A table data store 202, which can be retained among a plurality of data volumes 204 can include one or more of a delta store 206 (e.g. a paged delta part, which can optionally be OLTP optimized and can optionally include a merge process 208), a main store 210 (e.g. a main part that is fragmented consistent with features described herein and that can be compressed), and an index store 212 (e.g. one or more segmented indices). Other parts of the architecture can include a data manipulation language (DML) handling module or similar functionality 214, one or more query handling modules or similar functionality 216 (e.g. including multi-version concurrency control), and the like, an index builder 220 that supports the index store 212, a query language engine 222 (which can, for example, be a SQL engine), a complex events processing module (CEP) (e.g. an event handler, a stream processing module, etc.) 224 for receiving inputs from a user 226, and the like.

Figure 3:
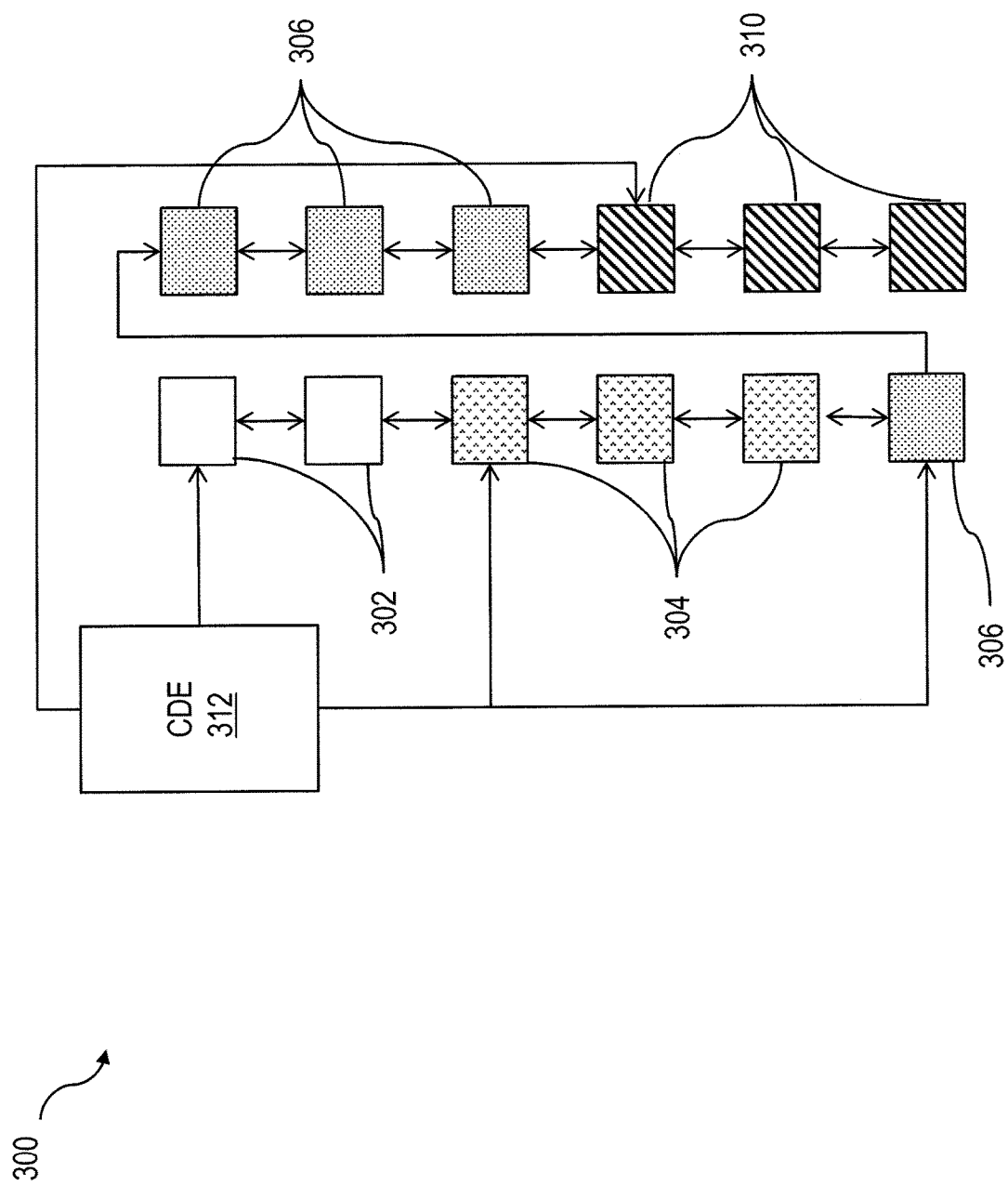
FIG. 3 is a diagram illustrating features of a unified table container page chain.

FIG. 3 shows a block diagram illustrating an example of a unified table container page chain 300. In general, a container can be represented as a page chain. The term pages, as used herein, refers to a basic unit of storage in a database. A page chain can generally be characterized as a set of pages that are linked in a given order. There can be a single page chain with a set of active pages, where writes are accepted (and which can be held in memory for fast appends). For example, these pages can be marked with a bit in the page header, so that reconstructing dictionaries from page chains at table load time (i.e., when the table is loaded into memory, etc.) can find the set of active pages to continue writing to the dictionary. Full pages will be then unmarked and flushed from memory.

A page size used by server's page size is generally established when the database is built, and typically cannot be changed. A representative page size can be on the order of 2 kB, 4 kB, 8 kB, 16 kB, or the like. Once the server is built the value usually cannot be changed. Different types of pages can store different types of database objects. For example, data pages can store data rows or columns for a table. Index pages can store index rows for one or more (or all) levels of an index. Large object (LOB) pages can store data for text and image columns, for Java off-row columns, and the like.

Also as shown in FIG. 3, sub-chains of the page chain can be defined for a delta part, a main part, dictionaries, index segments (optionally, not shown in FIG. 3), and the like such that a "whole" of each of these entities contains one or more pages. In some implementations of the current subject matter, a delta part can include both "hot" delta fragments 302 and "cold" delta fragments 304, which can be stored separately. The main part can also be subdivided into main fragments 306. Pages containing dictionary-compressed columnar data 310 can refer to pages containing dictionaries for them. Individual table parts can be loaded into main memory on-demand. A merge process can be decoupled from transaction handling such that a merge process can be executed at recovery time (e.g. during log replay). A page chain such as the example shown in FIG. 3 can be initiated by a container directory entry (CDE) 312.

A single RowID space can be used across pages in a page chain. A RowID, which generally refers to a logical row in the database, can be used to refer to a logical row in an in-memory portion of the database and also to a physical row in an on-disk portion of the database. A row index typically refers to physical 0-based index of rows in the table. A 0-based index can be used to physically address rows in a contiguous array, where logical RowIDs represent logical order, not physical location of the rows. In some in-memory database systems, a physical identifier for a data record position can be referred to as a UDIV or DocID, which can differ from a logical RowID in that the UDIV or DocID (or a comparable parameter) indicates a physical position of a row (e.g. a data record) while the RowID indicates a logical position. To allow a partition of a table to have a single RowID and row index space consistent with implementations of the current subject matter, a RowID can be assigned as a monotonically increasing ID for newly-inserted records and for new versions of updated records across fragments. In other words, updating a record will change its RowID, for example because an update is effectively a deletion of an old record (having a RowID) and insertion of a new record (having a new RowID). Using this approach, a delta store of a table can be sorted by RowID, which can be used for optimizations of access paths. Separate physical table entities can be stored per partition, and these separate physical table entities can be joined on a query level into a logical table.

When an optimized compression is performed during a columnar merge operation to add changes recorded in the delta part to the main part, the rows in the table are generally re-sorted. In other words, the rows after a merge operation are typically no longer ordered by their physical row ID. Therefore, stable row identifier can be used consistent with one or more implementations of the current subject matter. The stable row identifier can optionally be a logical RowID.

Use of a stable, logical (as opposed to physical) RowID can allow rows to be addressed in REDO/UNDO entries in a write-ahead log and transaction undo log. Additionally, cursors that are stable across merges without holding references to the old main version of the database can be facilitated in this manner. To enable these features, a mapping of an in-memory logical RowID to a physical row index and vice versa can be stored. In some implementations of the current subject matter, a RowID column can be added to each table. The RowID column can also be amenable to being compressed in some implementations of the current subject matter.

Figure 4:
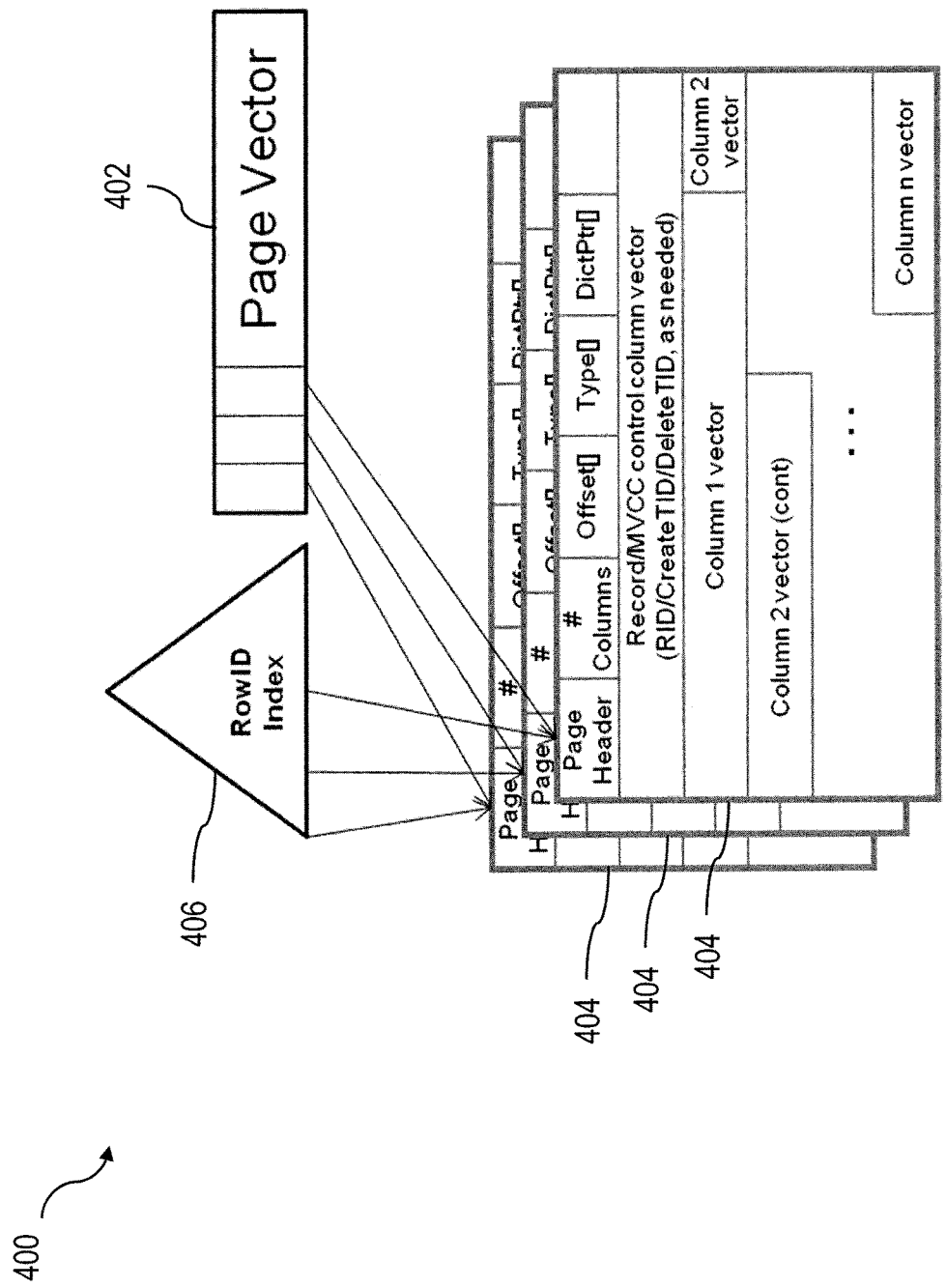
FIG. 4 is a diagram illustrating features of a unified table delta.

FIG. 4 shows a block diagram 400 of a unified table delta consistent with one or more implementations of the current subject matter. In some examples, a "hot" and "cold" delta approach can be used in which uncompressed data are retained in the "hot" delta part while dictionary-compressed data are retained in the "cold" delta part with a mini-merge performed between the hot and cold parts. Such a delta part can be considered as a single container. As shown in FIG. 4, each delta sub-chain can have its own transient structure. In other words, a separate structure can be used for each delta. A page vector 402 can hold page handles to individual pages 404 and can allow a fast iteration over the pages 404 (for example as part of a column or table scan). A page handle to an individual page 404 can include a pin or the like held in memory. As used herein, the term "pin" refers to holding a particular data page (which may also have been stored on disk) in memory. As an example, if a page is not pinned, it can be cleared from memory given it can be retrieved from disk if needed. Pinning is typically done on data paged being actively accessed so as to avoid potential performance degradations associated with reading the page from disk into memory.

A RowID index 406 can serve as a search structure to allow a page 404 to be found based on a given interval of RowID values. The search time can be on the order of log n, where n is very small. The RowID index can provide fast access to data via RowID values with a negligible (e.g. less than approximately 5%). For optimization, "new" pages can have a 1:1 association between RowID and row index, so that simple math (no lookup) operations are possible. Only pages that are reorganized by a merge process need a RowID index in at least some implementations of the current subject matter.

On-page RowID access consistent with implementations of the current subject matter can be provided as follows. Newly or recently created pages generally have no "holes" (or perhaps only very few holes) in the RowID list as it is unlikely that such pages would have undergone many updates or deletions of data records stored therein. A memory optimization for such cases can include only storing starting RowID values in a page. Older data, for example data at the beginning of a second delta fragment can be accessed via a binary search on the order of log n for a small value of n. A delta can, in at least some implementations of the current subject matter, remain always sorted by RowID.

Figure 5:
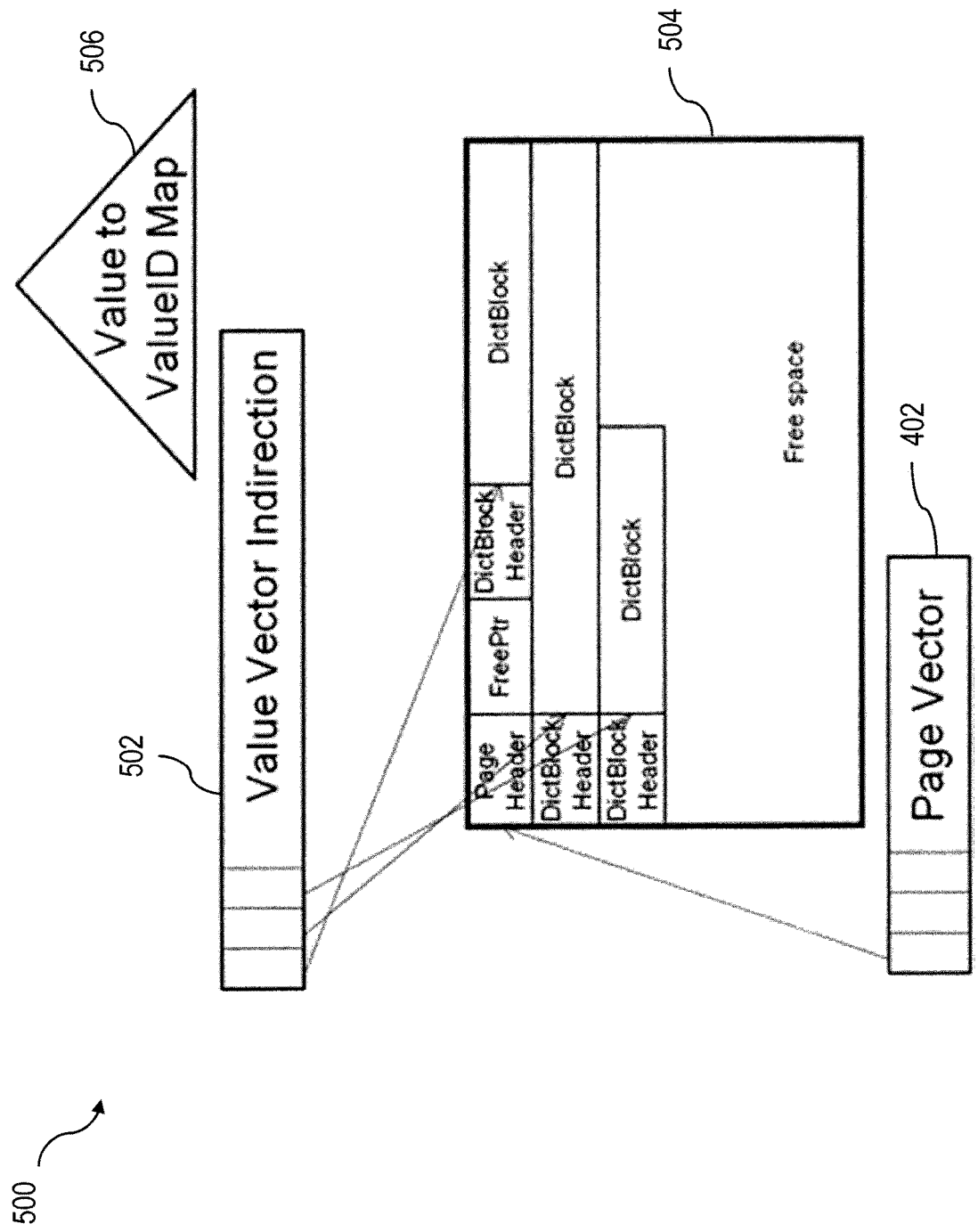
FIG. 5 shows a diagram illustrating features of a unified table unsorted dictionary.

FIG. 5 shows a block diagram 500 of a unified table unsorted dictionary. Consistent with one or more implementations of the current subject matter, column data in a delta part can use unsorted dictionaries. A transient structure can be provided per delta column dictionary. The page vector 402 can handle pinning of pages in memory. Direct access can be provided via a pointer from other structures. A value vector indirection 502 can allow a same number of values per dictionary block 504. This capability can support O(1) performance cost for lookup of a value by ValueID. A dictionary can assign a unique ValueID (typically a numeric value) to each unique value such that the unique values (which are typically larger in memory size than the ValueID) can be stored once rather than multiple times. A Value array is a structure used by the dictionary to retrieve values given a ValueID or vice versa. This technique, which can reduce the amount of memory needed to store a set of values where the values are not unique, is typically referred to as dictionary compression. A value to ValueID map 406 can support hash or Btree sizes on the order of 1 or on the order of log n for lookup of ValueID by value. A B-tree is a tree data structure that keeps data sorted and allows searches, sequential access, insertions, and deletions in logarithmic time. This capability can be necessary for dictionary compression. A Btree can be better for range scans, etc., but can be more expensive to maintain.

To achieve a best possible compression and also to support very large data tables, a main part of the table can be divided into one or more fragments. Main fragment size can be limited to some practical limit, which can, dependent on the specifics of a given implementation of the current subject matter, be sufficiently large to gain maximum performance due to optimized compression, sufficiently small to allow loading of a largest column of a fragment into main system memory and sorting of that column in main system memory, and sufficiently small to allow coalescing of two or more partially-empty fragments into a smaller number of fragments. One or more main fragments can be created for a table in a database. These fragments can contain row sets arranged in a temporal order.

Figure 6:
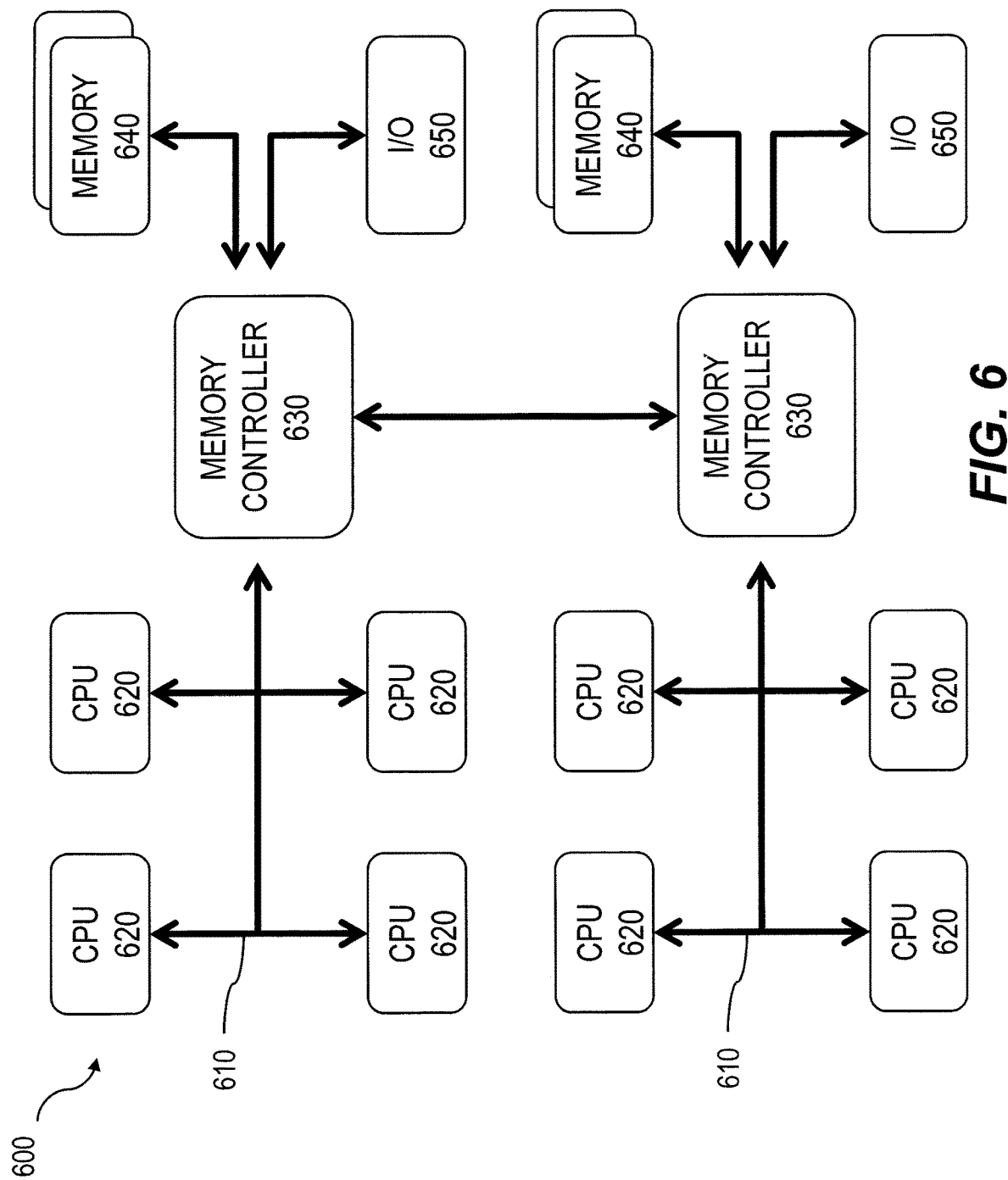
FIG. 6 shows a diagram illustrating a non-uniform memory access node.

The database 170 can use a non-uniform memory access (NUMA) architecture that includes a plurality of NUMA nodes. Diagram 600 of FIG. 6 illustrates one such NUMA node which includes a system bus 610 serving a set of data processors 620 (which may be multi-core processors). Each group of data processors 620 can have its own memory 630 and, in some cases, their own I/O channels 650. In some arrangements, the data processors 620 can access memory 640 associated with a different NUMA node via memory controller 630; however local memory (i.e., memory in the same NUMA node, etc.) provides faster access. Such an arrangement differs from multi-processor arrangements in which all processors use a single shared system bus to access memory.

The current subject matter provides for striped per processor core encoding of variable sized blocks in a dictionary. For example, a thread running on a particular processor core 620 can encode variable sized elements into a separate page chain belonging to this processor core. However, considering number of tables in an enterprise level database and continuing increase in core count (hundreds today), this would lead to prohibitively large space expenses (on the order of millions of pages or tens of gigabytes in a large-scale enterprise resource planning system). To alleviate this problem, the dictionary encoding can start with a single page chain. As the table size increases, the number of page chains will be increased as well up to the number of available processor cores.

As one example, and with reference to diagram 700 of FIG. 7, at 710, dictionary encoding is first started with a single page chain. Thereafter, at 720, the number of page chains are increased to n when the count of pages reaches a predetermined limit (e.g., 2*n pages for power of two n only, etc.). The number of page chains is stopped, at 730, at a maximum of n=available processor cores (may be also a non-power of two).

Further, when storing a new variable sized value to the dictionary, a page chain can be picked that corresponds to the current core index (on which the executing thread currently runs) modulo number of existing page chains. In addition, threads originating from processors 620 from the same NUMA node can be assigned to the same page chain in order to avoid NUMA interconnect communications. In certain cases, the threads are assigned to different page chains, for example, when the number of page chains is less than the number of NUMA nodes. Stated differently, core indices and number of page chains can be picked in a way that modulo operation hashes core indices in the same NUMA node to the same page chain (i.e., one page chain is preferably only used on one NUMA node).

One or more aspects or features of the subject matter described herein can be realized in digital electronic circuitry, integrated circuitry, specially designed application specific integrated circuits (ASICs), field programmable gate arrays (FPGAs) computer hardware, firmware, software, and/or combinations thereof. These various aspects or features can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device. The programmable system or computing system may include clients and servers. A client and server are generally remote from each other and typically interact through a communication network. The relationship of client and server arises by virtue of computer programs running on the respective computers and having a client-server relationship to each other.

These computer programs, which can also be referred to as programs, software, software applications, applications, components, or code, include machine instructions for a programmable processor, and can be implemented in a high-level procedural language, an object-oriented programming language, a functional programming language, a logical programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid-state memory or a magnetic hard drive or any equivalent storage medium. The machine-readable medium can alternatively or additionally store such machine instructions in a transient manner, such as for example as would a processor cache or other random access memory associated with one or more physical processor cores.

In the descriptions above and in the claims, phrases such as "at least one of" or "one or more of" may occur followed by a conjunctive list of elements or features. The term "and/or" may also occur in a list of two or more elements or features. Unless otherwise implicitly or explicitly contradicted by the context in which it is used, such a phrase is intended to mean any of the listed elements or features individually or any of the recited elements or features in combination with any of the other recited elements or features. For example, the phrases "at least one of A and B;" "one or more of A and B;" and "A and/or B" are each intended to mean "A alone, B alone, or A and B together." A similar interpretation is also intended for lists including three or more items. For example, the phrases "at least one of A, B, and C;" "one or more of A, B, and C;" and "A, B, and/or C" are each intended to mean "A alone, B alone, C alone, A and B together, A and C together, B and C together, or A and B and C together." In addition, use of the term "based on," above and in the claims is intended to mean, "based at least in part on," such that an unrecited feature or element is also permissible.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and subcombinations of the disclosed features and/or combinations and subcombinations of several further features disclosed above. In addition, the logic flows depicted in the accompanying figures and/or described herein do not necessarily require the particular order shown, or sequential order, to achieve desirable results. Other implementations may be within the scope of the following claims.

What is claimed is:

1. A method comprising:
   initiating dictionary encoding in a table of a database system using a first page chain, the database system comprising a plurality of processor cores, each page chain comprising a plurality of chained pages;
   generating n additional page chains for use by the dictionary encoding when the count of pages used by the dictionary encoding reaches a pre-determined limit;
   ceasing generation of further additional page chains once the number of additional page chains n is equivalent to one less than a number of available processor cores; and
   storing a new variable sized value to the dictionary, the storing comprising picking a page chain from a plurality of existing page chains corresponding to a current core index of a processor core of the plurality of processor cores on which an executing thread currently runs modulo a number of the plurality of existing page chains, the plurality of existing page chains comprising the first page chain and then additional page chains, the current core index corresponding to the processor core on which the executing thread is currently running.

2. The method of claim 1, wherein the page chains comprise a set of active pages on which write operations are accepted.

3. The method of claim 2, wherein the database comprises an in-memory architecture.

4. The method of claim 3, wherein the active pages are held in memory.

5. The method of claim 1, wherein the database comprises a non-uniform memory access (NUMA) architecture.

6. The method of claim 5, wherein the NUMA architecture comprises a plurality of NUMA nodes, wherein processors forming part of the same NUMA node are assigned to the same page chain.

7. A non-transitory computer program product storing instructions which, when executed by at least one hardware data processor forming part of at least one computing system, result in operations comprising:
  initiating dictionary encoding in a table of a database system using a single page chain, the database system comprising a plurality of processor cores, each page chain comprising a plurality of chained pages;
  generating n additional page chains for use by the dictionary encoding when the count of pages used by the dictionary encoding reaches a pre-determined limit;
  ceasing generation of further additional page chains once the number of additional page chains n is equivalent to one less than a number of available processor cores; and
  storing a new variable sized value to the dictionary, the storing comprising picking a page chain from a plurality of existing page chains corresponding to a current core index of a processor core of the plurality of processor cores on which an executing thread currently runs modulo a number of the plurality of existing page chains, the plurality of existing page chains comprising the first page chain and then additional page chains, the current core index corresponding to the processor core on which the executing thread is currently running.

8. The computer program product of claim 7, wherein the page chains comprise a set of active pages on which write operations are accepted.

9. The computer program product of claim 8, wherein the database comprises an in-memory architecture.

10. The computer program product of claim 9, wherein the active pages are held in memory.

11. The computer program product of claim 7, wherein the database comprises a non-uniform memory access (NUMA) architecture.

12. The computer program product of claim 11, wherein the NUMA architecture comprises a plurality of NUMA nodes, wherein processors forming part of the same NUMA node are assigned to the same page chain.

13. A system comprising:
  at least one data processor; and
  memory storing instructions which, when executed by the at least one data processor, result in operations comprising:
    initiating dictionary encoding in a table of a database system using a single page chain, the database system comprising a plurality of processor cores, each page chain comprising a plurality of chained pages;
    generating n additional page chains for use by the dictionary encoding when the count of pages used by the dictionary encoding reaches a pre-determined limit; and
    ceasing generation of further additional page chains once the number of additional page chains n is equivalent to one less than a number of available processor cores; and
    storing a new variable sized value to the dictionary, the storing comprising picking a page chain from a plurality of existing page chains corresponding to a current core index of a processor core of the plurality of processor cores on which an executing thread currently runs modulo a number of the plurality of existing page chains, the plurality of existing page chains comprising the first page chain and the n additional page chains, the current core index corresponding to the processor core on which the executing thread is currently running.

14. The system of claim 13, wherein the page chains comprise a set of active pages on which write operations are accepted.

15. The system of claim 13, wherein the at least one processor and memory form part of the database and the database is an in-memory database having a non-uniform memory access (NUMA) architecture that comprises a plurality of NUMA nodes, wherein processors forming part of the same NUMA node are assigned to the same page chain.

* * * * *